Patented June 1, 1948

2,442,602

UNITED STATES PATENT OFFICE 2,442,602

METHOD FOR THE PRODUCTION OF EASILY SOLUBLE CHEMOTHERAPEUTICS OF THE SULPHANILAMIDE GROUP

Oluf Hübner, Klampenborg, near Copenhagen, Denmark, assignor to H. Lundbeck & Co., Kemisk Pharmaceutisk Laboratorium A/S, Copenhagen, Denmark, a firm No Drawing. Application November 23, 1942, Serial No. 466,596½. In Denmark November 19, 1941

Section 1, Public Law 690, August 8, 1946
Patent expires November 19, 1961

8 Claims. (Cl. 167—51.5)

It is known per se that from medicines of the sulphanilamide group combinations may be produced which are easily soluble in water by neutral or nearly neutral reaction by introducing in these medicines groups that cause solubility, e. g. sulphonic acid groups or carbonic acid groups.

The combinations formed hereby, however, possess the drawback that their therapeutic effect is considerably decreased as compared with the original combination.

Medicines of the sulphanilamide group hitherto almost without exception have been used perorally for the treatment of systemic septic illnesses.

In some cases, however, it has been tried to locally apply sulphanilamides for the treatment of localized inflammations. Thus, skin diseases have been treated by penciling or besprinkling of solutions of various sulphanilamides dissolved in water, alcohol or alcohol aceton, or by application of salves containing sulphanilamides. Likewise, surgical illnesses, such as infected wounds, open fractures and the like, have been treated by powdering with crystallinic sulphanilamides in mixture with other materials. Further, angina has been treated by application of prontosil solutions.

In some eye illnesses sulphanilamide preparations have been used with no doubt favourable effect in peroral dosing. In the extraordinarily uncommon experiments with local application, published in the current literature, however, any favourable effect has not been established.

A local treatment with sulphanilamide preparations seems to be quite natural and suitable in many cases, i. e., not only for skin diseases and surgical illnesses, but also and above all for eye illnesses or illnesses in the eye regions, the lachrymal canals or in mucous membranes or walls in various cavities of the body.

For this purpose, however, there hitherto did not exist any suitable sulphanilamide preparation, as the strong, local irritating characters of the preparations hitherto known have proved to be an insuperable obstacle for the use of the preparations as well in ophthalmology as for the treatment of mucous membranes and walls in body cavities. The reason is that the sulphanilamides may be dissolved only in concentrations with bactericidal effect with use of either strong bases or strong acids. Solutions of salts of certain sulphanilamides, such as 2-(p-aminobenzolsulphonacid)-amido-pyridin, in strong bases in limited concentration have been used clinically in order to introduce sulphanilamides into the circulation of the blood either by injecting in the rectum or by intramuscular injection. The latter, however, is carried out at the peril of abscess formation and the former not without considerable irritation caused by the highly alkaline character of the preparation, which makes it useless for ophthalmology and for local treatment of mucous membranes and walls in the body cavities.

Numerous attempts have been made to produce neutral solutions of various sulphanilamide derivatives, but this has been possible only by sacrifice of the chemo-therapeutic effect. Thus, with 2(p-aminobenzolsulphonacid)-amido-4-methylthiazol a solution in 50% glucose has been produced, but this solution has proved to possess no chemo-therapeutic effect, since the sulphathiazolmolecule is changed, the para amino group being blockaded.

It has now proved possible in a neutral liquid to produce easily soluble chemo-therapeutics of the sulphanilamide group, the activity of which is not decreased, by making 2-sulphanilamide-1,3,4-thiazoles, which in the 5-position may be substituted by alkyl or aryl, react with ammonia or aliphatic amines, hereby being produced combinations of a saline nature which by neutral reaction may form strongly concentrated aqueous solutions. It is stated that by parenteral administration these combinations do not give rise to tissue irritation, and likewise they have proved non-toxic by parenteral administration of large doses to animals.

Furthermore, it has been proved possible to produce bactericidal solutions of sulphanilamide medicines, which are fitted for local treatment of eye illnesses or illnesses in the eye regions and in mucous membranes or walls in the body cavities, by making 2-sulphanilamido-5-alkyl-1,3,4-thiodiazol or 2-sulphanilamido-5-aryl-1,3,4-thiodiazol react with aqueous solutions of ammonia or aliphatic amines, whereby the solutions are obtained with pH-values near the neutral point or with more or less approximation to isotonic character with the body-liquid in question.

Solutions, which are about eye-isotonic but which also may be used for local treatment of mucous membranes and body cavities, may be produced from approximately equivalent quantities of the amide and an aliphatic amin or ammonia in concentration of about 4% 2-sulphanilamido-5-alkyl-1,3,4-thiodiazol or 2-sulphanilamido-5-aryl-1,3,4-thiodiazol.

The solutions, however, also may be produced in lesser concentration, and suitable salts added in order to obtain the desired isotonic character.

Such solutions, which are entirely clear, have a pH-value of 7.0–7.4 or may be directed to such a pH-value without any separations, even at far greater concentrations than those which are taken into consideration for the purpose of the present invention. Therefore, they without any inconvenience may be dropped for instance into the eyes or the nose, to give a high therapeutic effect. The advantage with a medicine produced in this manner consists partly in that the treatment will be cheaper than with use of the great quantities, which are necessary in peroral doses in order to obtain the concentration of the medicine in the water phase of the total body, which is necessary for the treatment of the local illness, partly in that it is avoided to affect the entire organism with a medicine when only a local effect is desired.

A local treatment with solutions produced according to the present invention has proved to give surprisingly good results in eye illnesses, such as cornea inflammation, lachrymal canal infections or inflammations in the glands or hair-follicles at the edge of the eye-lid, etc. In otolaryngology these solutions also have proved to be of great importance, for instance in local treatment of illnesses in the jaw-cavity, the head-cavity or bi-cavities. The solutions further may be used for instance for local treatment of infections in the urinal tract, for instance by injection into the bladder in case of the bladder inflammation or by washing of vagina or urethra in case of gonorrhea.

In the following embodiments the invention will be illustrated by some embodiments without the invention, however, being limited to the reaction conditions given in the examples, the conditions described for the reaction, the concentration described of the final product, or by any means to the dissolved form or to the stated reaction components which are given only as examples.

Embodiment 1

To 5.50 g. 2-sulphanilamido-5-methyl-1,3,4-thiodiazol are added 1.36 g. 25% ammonia water and then it is diluted with water to a total of 13.5 g. A clear solution is obtained with a pH of 7.05.

Embodiment 2

To 5.68 g. 2-sulphanilamido-5-ethyl-1,3,4-thiodiazol are added 1.36 g. 25% ammonia water and it is diluted with water to 13.5 g. A clear solution is obtained with pH 7.2–7.5.

Embodiment 3

To 5.40 g. 2-sulphanilamido-5-methyl-1,3,4-thiodiazol are added 1.21 g. monoethanolamin and it is diluted with water to 13.5 g. After having been left for some time or after a slight heating a clear solution is obtained with pH 7.2–7.4 The solution is stable at room temperature.

Embodiment 4

To 5.40 g. 2-sulphanilamido-5-methyl-1,3,4-thiodiazol are added 2.98 g. triethanolamine, after which it is diluted with water to 13.5 g. A clear solution is obtained with pH about 7.2.

In the same way other 2-sulphanilamido-1,3,4-thiodiazoles may be made to react, e. g. 2-sulphanilamido-5-phenyl-1,3,4-thiodiazol. Other amines than those described may also be used, e. g. methylamines and ethylamines.

I claim:

1. A method for the production of an easily soluble chemo-therapeutic of the sulphanilamide group, consisting in that a 2-sulphanil-amido-1,3,4-thiodiazole, having in the 5-position, a radical of the group consisting of hydrogen, alkyl and aryl, is reacted with a compound selected from the group consisting of ammonia and aliphatic amines.

2. A method for the production of easily soluble chemo-therapeutics of the sulphanilamide group for producing bactericidal solutions of sulphanilamide medicines, which solutions are adapted for local treatment of eye illnesses and of mucous membranes and walls in the body cavities, consisting in that a 2-sulphanil-amido-1,3,4-thiodiazole having, in the 5-position, a radical selected from the group consisting of hydrogen, alkyl and aryl, is reacted with an aqueous solution of a compound selected from the group consisting of ammonia and aliphatic amines, the resulting solution having a pH approximating the neutral point and being approximately isotonic with the body-liquid at the point of application.

3. A method for the production of easily soluble chemo-therapeutics of the sulphanilamide groups for producing bactericidal solutions of sulphanilacide medicines, which solutions are adapted for local treatment of eye illnesses and of mucous membranes and walls in the body cavities, consisting in that a 2-sulphanil-amido-1,3,4-thiodiazole having, in the 5-position, a radical selected from the group consisting of hydrogen, alkyl and aryl, is reacted with an aqueous solution of a compound selected from the group consisting of ammonia and aliphatic amines, the resulting solution having a pH approximating the neutral point and being approximately isotonic with the body-liquid at the point of application, the reacting ingredients being present in equivalent quantities and in amounts to give approximately a 4% solution.

4. A method for the production of easily soluble chemo-therapeutics of the sulphanilamide group for producing bactericidal solutions of sulphanilamide medicines, which solutions are adapted for local treatment of eye illnesses and of mucous membranes and walls in the body cavities, consisting in that a 2-sulphanil-amido-1,3,4-thiodiazole having, in the 5-position, a radical selected from the group consisting of hydrogen, alkyl and aryl, is reacted with an aqueous solution of a compound selected from the group consisting of ammonia and aliphatic amines, the resulting solution having a pH approximating the neutral point and adding a neutral salt to said resulting solution with a content of the sulphanilamide derivative of less than about 4% in order to obtain a solution isotonic with the body-liquid at the point of application.

5. The reaction product of a 2-sulphanil-amido- 1,3,4-thiodiazole, having in the 5-position a radical selected from the group consisting of hydrogen, alkyl and aryl, with a compound selected from the group consisting of ammonia and aliphatic amines.

6. An isotonic aqueous solution of the compound set forth in claim 1, the aqueous solution of said compound per se being at a pH of approximately the neutral point.

7. A composition containing an easily soluble chemo-therapeutic of the sulphanilamide group for producing bactericidal solutions of sulphanilamide medicines, which solutions are fitted for local treatment of eye illnesses, of mucous membranes, and walls in the body cavities, said composition being an aqueous solution of the compound of claim 1, the aqueous solution of said compound per se having a pH value at approximately the neutral point, being approximately isotonic with the body liquid at the point of application, the compound of claim 1 being present in an amount to give approximately a 4% solution.

8. A composition containing easily soluble chemo-therapeutics of the sulphanilamide group for producing bactericidal solutions of sulphanilamide medicines, which solutions are fitted for local treatment of eye illnesses, of mucous membranes, and of walls in the body cavities, said composition comprising an aqueous solution of the compound of claim 1, the aqueous solution of said compound per se having a pH value approximating the neutral point, and containing an amount of the sulphanilamide derivative of less than about 4% together with an amount of a neutral salt to produce a solution isotonic with the body liquid at the point of application.

OLUF HÜBNER.

REFERENCES CITED

The following references are of record in the file of this patent:

UNITED STATES PATENTS

| Number | Name | Date |
|---|---|---|
| 2,186,773 | Stuart | Jan. 9, 1940 |
| 2,254,877 | Stuart | Sept. 2, 1941 |
| 2,341,086 | Dohrn | Feb. 8, 1944 |
| 2,358,031 | Roblin et al. | Sept. 12, 1944 |

FOREIGN PATENTS

| Number | Country | Date |
|---|---|---|
| 61,112 | Denmark | July 12, 1943 |
| 111,230 | Australia | Aug. 22, 1940 |
| 114,894 | Australia | Apr. 2, 1942 |
| 545,419 | Great Britain | May 22, 1942 |

OTHER REFERENCES

Proceedings Indian Academy of Sciences, vol. 13-A, pp. 386-389 (May 1941).

Journal American Chem. Soc., vol. 62, pages 2002-2005 (Aug. 1940).

Certificate of Correction

Patent No. 2,442,602.

June 1, 1948.

OLUF HÜBNER

It is hereby certified that errors appear in the printed specification of the above numbered patent requiring correction as follows: Column 2, line 29, for "1,3,4-thiazoles" read *1,3,4-thiodiazoles*; line 39, strike out the word "been"; column 4, line 40, claim 3, for "groups" read *group*; line 42, same claim, for "acide" read *amide*; and that the said Letters Patent should be read with these corrections therein that the same may conform to the record of the case in the Patent Office.

Signed and sealed this 20th day of July, A. D. 1948.

[SEAL]

THOMAS F. MURPHY,
*Assistant Commissioner of Patents.*